United States Patent

De Vries

[15] 3,659,231

[45] Apr. 25, 1972

[54] MULTI-STAGE SOLID-STATE SIGNAL-TRANSMISSION SYSTEM

[72] Inventor: Adrian J. De Vries, Elmhurst, Ill.

[73] Assignee: Zenith Radio Corporation, Chicago, Ill.

[22] Filed: Mar. 17, 1971

[21] Appl. No.: 125,099

[52] U.S. Cl. ....................333/72, 333/30, 310/9.8

[51] Int. Cl. ....................H03h 7/02, H03h 9/00

[58] Field of Search ....................333/30, 72; 310/8, 8.1, 9.6, 310/9.7, 9.8

[56] References Cited

UNITED STATES PATENTS 3,582,838 6/1971 De Vries....................333/72

*Primary Examiner*—Herman Karl Saalbach
*Assistant Examiner*—Marvin Nussbaum
*Attorney*—Francis W. Crotty

[57] ABSTRACT

Undesired signal feed-through, due to inherent coupling between the input and output transducers of an acousto-electric surface-wave filter, is substantially attenuated by connecting two or more such filters in series and arranging the effective inter-transducer spacings so that the sum of feed-through components in the different filters add to a minimum. The required effective spacings are obtained either by using different actual physical spacings of the transducer pairs in the filters, or by providing different acoustic wave propagation velocities in the different stages. In a special case wherein the system consists of three filters in series, time-delayed output signals, due to reflected surface waves, also are compensated.

3 Claims, 3 Drawing Figures

Inventor
Adrian J. DeVries
By Francis W. Crotty
Attorney

MULTI-STAGE SOLID-STATE SIGNAL-TRANSMISSION SYSTEM

BACKGROUND OF THE INVENTION

The present invention pertains to solid-state circuitry. More particularly, it relates to multi-stage solid-state signal transmission systems.

It is known that an electrode array composed of a pair of interleaved comb-shaped electrodes of conductive teeth at alternating potentials may be utilized to launch acoustic surface waves in a piezoelectric medium. In the simplified embodiment of a piezoelectric ceramic wafer poled perpendicularly to the propagating surface, the waves travel at right angles to the electrode elements; in crystalline materials, the waves may travel at an acute angle to the elements, the particular angle in a given case being a function of the crystallography of the material relative to the configuration of the array.

The surface waves are converted back into an electrical signal by a similar array of conductive teeth coupled to the piezoelectric medium and spaced from the input electrode array. In principle, the tooth patterns are analogous to antenna arrays. Consequently, similar signal selectivity is possible so as to permit the elimination of critical and/or much larger or more cumbersome components normally associated with selective circuitry. These devices, with their small size, are particularly useful in conjunction with solid-state integrated circuitry where signal selectivity is desired. Present acousto-electric signal-transmitting devices, also known as surface-wave integratable filters or SWIFS, have a finite distance between the input and output transducers. Consequently, a finite time is required for an acoustic surface-wave signal to travel along the path from the input transducer to the output transducer. At the output transducer, part of the acoustic wave energy is converted to electrical energy and delivered to a load, part of the acoustic-wave energy travels beyond the transducer, and part of the acoustic wave energy is reflected back along the original path toward the input transducer. This latter reflected surface wave, which is smaller in magnitude than the original surface wave, intercepts the input transducer where it is again similarly reflected, further attenuated in amplitude for a third transit back along the same path toward the output transducer, resulting in a diminished replica of the original surface-wave signal at the output transducer. As a result, this "triple transit" diminished replica of the original surface-wave signal arrives at the output transducer later than the original surface-wave signal, the time delay being equal to twice the time required for a surface-wave signal to traverse the path from the input transducer to the output transducer.

The effect of these reflected signals, due to the spacing between the input and output transducers, varies with the amount of time delay. If these units are used, for example, as signal-selective devices in a television intermediate frequency amplifier, the reflected signal components appear as undesirable "ghosts" in the picture. One previous method for approaching this problem has been to reduce the time delay, which is directly proportional to the distance between the input transducer and the output transducer, by placing the output transducer in close proximity to the input transducer. This approach, however, has rapidly reached a point of diminishing returns because direct feed through becomes large when the output transducer is positioned close to the input transducer. That is, with close input-output spacings, the input transducer and the output transducer are inherently coupled inductively and/or capacitively as well as acoustically through the piezoelectric medium, resulting in a loss of signal selectivity at the output of the device. Other prior approaches to the problem include optimizing the value of output load impedance in order that a maximum amount of electrical signal is transferred from the output transducer to the load and further include reducing the reflections by depositing a surface-wave attenuating material on the wave propagating medium between the transducers.

With the foregoing as background, a direct and practical solution to the reflected-wave problem is disclosed and claimed in my U.S. Pat. 3,559,115 issued Jan. 26, 1971, and assigned to the assignee of the present application. In accordance with that approach, the input and output transducers of each of a plurality of series-connected filter stages have an effective spacing in the direction of acoustic-wave propagation determined by the following equation:

$$D_n = D_o + \frac{\lambda}{2}\left(\frac{n}{N} \pm P\right), \qquad (1)$$

where $D_n$ is the inter-transducer distance for the particular stage $n$ of the plurality $N$ of filter stages, $D_o$ is any convenient distance, $\lambda$ is the wavelength corresponding to the center-frequency of the filter and $P$ is any integer. Thus, with two filter stages in series, the input-output transducer spacing as between the two differs by one-fourth acoustic wavelength. The result is that the reflected wave energy of the two different stages adds to zero in the input transducer of the second stage. When there are three stages in series, the input-output spacings of the transducers differ successively from one another by one-sixth wavelength. Again, cancellation of the different reflected wave components occurs in the input transducer of the last stage. While achieving the desired result of cancelling or attenuating the reflected waves, that approach may still permit the transmission of undesired signal components by reason of feed-through or inter-transducer coupling of the kind mentioned above.

It is, accordingly, one object of the present invention to provide a multi-stage solid-state signal transmission system generally similar to that of the aforesaid patent but in which direct feed-through is eliminated or at least substantially attenuated.

A particular object of the present invention is to provide a multi-stage solid-state signal-transmission system in which both undesired reflected-wave-effects and undesired feed-through are at least reduced.

A multi-stage solid-state signal-transmission system constructed in accordance with the present invention includes a plurality $N$ of mutually isolated acousto-electric filter stages each comprising an input transducer coupled to an acoustic-wave propagating medium and responsive to an applied electrical signal of a predetermined center frequency for establishing acoustic waves of a predetermined acoustic wavelength in the medium. Each filter stage includes an output transducer coupled to the medium and spaced from its associated input transducer in the direction of acoustic wave propagation, each output transducer being responsive to acoustic waves in the medium for developing an electrical signal corresponding thereto. Also included are coupling means for impressing the electrical signal developed by the output transducer of each stage on the input transducer of the next succeeding stage of the plurality of stages. Finally, the input and output transducers of each particular stage have an effective spacing in the direction of acoustic-wave propagation of a distance in accordance with the equation:

$$D_n = D_o + \frac{\lambda}{N}(n-1) + P_n\lambda \qquad (2)$$

where $D_n$ is the distance for the particular stage $n$ of the plurality $N$ of filter stages, $D_o$ is any convenient distance, $\lambda$ is the wavelength of the center-frequency acoustic waves and $P_n$ is any convenient integer or zero.

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements and in which:

Figure 1:
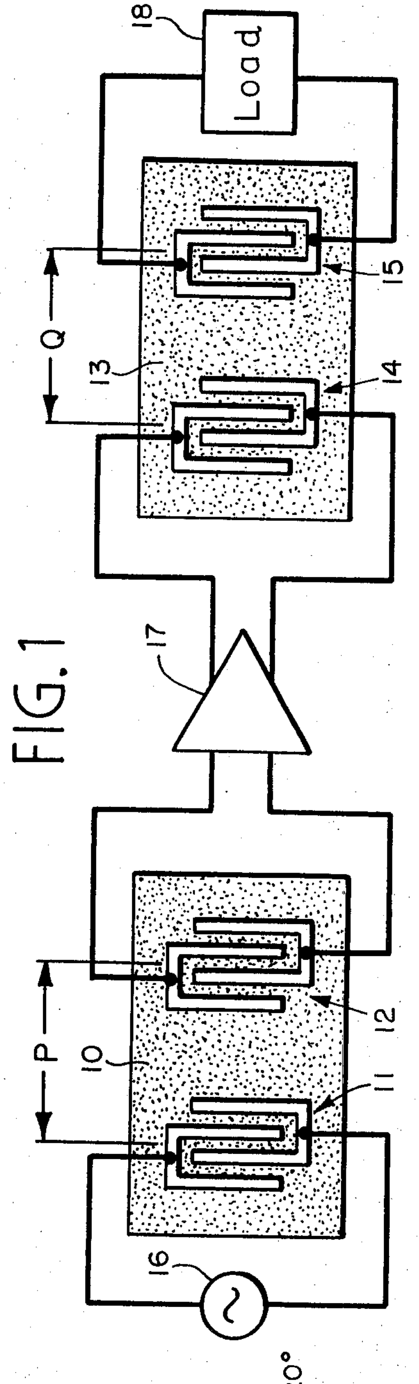
FIG. 1 is a partly schematic plan view of an acousto-electric signal-transmitting device.

With reference to FIG. 1, a piezoelectric acoustic-wave propagating medium 10 has a pair of electrode arrays 11 and 12 mechanically coupled to its surface to constitute therewith an input transducer and an output transducer, respectively, of the first stage of a two-stage system. A similar or identical acoustic-wave-propagating medium 13 has another pair of electrode arrays 14 and 15 mechanically coupled to it to constitute, respectively, an input transducer and an output transducer of the second stage of the system. Each array is constructed of two interleaved comb-type electrodes of a conductive material such as gold and is vacuum deposited on the planar surface of a lapped and polished piezoelectric material such as PZT, lithium niobate or quartz. Maximum amplitude of response is achieved in the system for an input signal of such frequency that its wavelength, for surface waves in the materials of which mediums 11 and 13 are comprised, is twice the distance between the centers of two adjacent teeth in an electrode array. For use in a 40 mhz television intermediate-frequency amplifier, and using a PZT substrate, for example, this distance is in the order of 0.001 inch.

An input signal source 16 is connected across input transducer 11 of the first stage. Output transducer 12, in turn, is coupled to input transducer 14 of the second stage by an amplifier 17 which serves to increase the amplitude of signals developed by source 16 and transmitted through the first stage, in order at least partially to compensate the attenuation losses inherently encountered in both stages of the system, and also to afford mutual isolation between the first and second stages. A suitable load 18 is connected across output transducer 15 of the second stage. As described in more detail in the aforesaid patent, a plurality of small coils may be connected individually across respective different ones of transducers 11, 12, 14 and 15 to tune out the clamped capacity of each transducer.

In the system of FIG. 1, the center-to-center inter-transducer spacing *P* and Q of the two stages are different. Distance *P* may be any convenient distance such as, for example, 10 times the wavelength at the center frequency of acoustic surface waves to be translated in the system. Distance Q differs from distance *P* by an odd multiple of one-half wavelength of the center-frequency acoustic wave employed in the system. In the case of distance Q being a single one-half wavelength greater than distance *P*, the distance Q is 10.5 wavelengths for the example given above utilizing a distance *P* of 10 wavelengths.

In operation, direct piezoelectric surface-wave transduction is accomplished by input transducer 11. Periodic electric fields are produced along the comb array when a signal from signal source 16 is applied across the comb array. These fields cause perturbations or deformations of the surface of medium 10 by piezoelectric action. Efficient generation of surface waves occurs when the stress components produced by the electric fields in the piezoelectric medium substantially match the stress components associated with the surface-wave mode. The mechanical perturbations travel along the surface as Rayleigh waves representative of the input signal. Signal source 16, for example the output circuit of the converter of a superheterodyne television receiver, may produce a range of signal frequencies, but due to the selective nature of the arrangement, only a selected wave of a particular frequency and its intelligence-carrying sidebands are converted to surface waves.

The potential impressed between the interleaved comb electrodes produces two surface waves traveling along the surface of medium 10 in opposite directions away from transducer 11. The surface wave propagating along the medium to the right of input transducer 11 couple to output transducer 12 and are converted to an electrical signal which is fed to amplifier 17. The surface waves traveling to the left of input transducer 11 intersect the end of medium 10. Effects produced by the acoustic energy reflected at that end of the medium may be minimized by providing acoustic absorbers on the end portion of the medium or by serrating the end in order to disperse such surface-wave energy.

As mentioned previously, not all of the acoustic-wave energy arriving at either output transducer is converted to electrical energy. A portion of the energy is transmitted through or beyond the output transducer and another portion of the energy is reflected by the output transducer. In the embodiment of FIG. 1, the waves reflected by output transducers 12 and 15 are dealt with by one of the previously mentioned approaches such as depositing surface-wave-attenuating material between the input and output transducers in each stage or by placing each output transducer in close proximity to its input transducer.

The operation of the second stage is basically the same, insofar as the primary signal is concerned, as that of the first. The amplified output signals from the first stage are delivered to amplifier 17 and impressed across input transducer 14 of the second stage in the same manner as signals from source 16 are applied across input transducer 11 of the first stage. Consequently, the potential impressed between the interleaved comb electrodes of transducer 14 produce two surface waves traveling along the surface of medium 13 in opposing directions away from the transducer. A portion of the surface-waves propagating along medium 13 to the right of input transducer 14 couples to output transducer 15 of the second-stage and is converted to an electrical signal which is directly applied to load 18. Surface waves traveling to the left of input transducer 14 are not utilized and will be absorbed or dispersed. Similarly, surface waves reflected by output transducer 15 are dealt with, if necessary, by the use of an attenuating material deposited between transducers 14, 15 or are minimized by employing a close spacing between such transducers.

In addition to the signal energy transmitted from input transducers 11 and 14 to their respective output transducers 12 and 15 by surface-wave transduction, other signal energy may be directly transmitted from each input transducer to its output transducer by virtue of the inherent electrical coupling between those structures. Such direct coupling is known as feed-through and while the coupling may be inductive, it usually is the result of the inter-transducer capacitance inherently present whenever two conductive structures are separated by a dielectric medium as is the case here. Accordingly, the output derived from each stage may include one component attributable to energy transfer by way of acoustic surface wave phenomenon and another, but undesired, component due to inherent electrical coupling between each transducer pair. Generally, the acoustic-wave contribution is distinctly the larger of the two. The system is arranged, principally by selecting the relative values of the effective spacings P and Q, so that the dominant output of the system is that obtained through surface-wave transduction while the electrical-coupling component is reduced to a second order effect.

More particularly, the output from first stage 10 comprises the acoustic surface wave contribution of relatively large amplitude and the electric-coupling component which is of smaller amplitude and is phase displaced from the acoustic wave contribution. The electric coupling component leads the other component because it does not experience the delay of the acoustic surface wave in traveling from transducer 11 to transducer 12.

The two-component output from the first stage is applied to the second stage where it is translated in the same fashion as in the first stage. In this case, the signal developed at output transducer 15 again comprises the contribution due to electric-coupling and surface-wave transduction and each, in turn, has two components. Specifically, the electric-coupling contribution has one component corresponding to the acoustic-wave related component of the input to transducer 14 and a second component corresponding to the electric-coupling related component of that input. As translated to the output transducer, these components have a smaller amplitude than those developed at the output by surface-wave transduction.

In fact, the electric-coupling related component now becomes a second order effect and may be ignored. At the same time, the output developed in transducer 15 by way of acoustic surface wave transduction includes the desired acoustic-wave related component of the input to transducer 14 and further includes the electric-coupling related component of that input. By virtue of the half-wavelength difference in spacings *P* and Q, however, the acoustic-wave related component of the output developed at transducer 15 due to electric coupling appears in counter phase to the electric-coupling related component of the output developed at transducer 15 due to acoustic-wave transduction. Since these two signal components are of opposite phase they will cancel each other if the parameters of the system are so adjusted that they are of the same amplitude. Hence, the output signal delivered to load 18 may be made to correspond to the desired input signal without any appreciable spurious components arising from electrical coupling or feed-through. The described solution to the problem presented by feed-through is particularly attractive as a companion to reducing effects of reflected signals by means of close spacings of the input and output transducers. While such close spacing, in order to reduce spurious signals arising from reflected wave energy, tends in itself to increase the transmission of spurious signals due to feed-through, such feed-through signals are themselves mutually compensatory by virtue of the use of the half-wave spacing difference.

Figure 2:
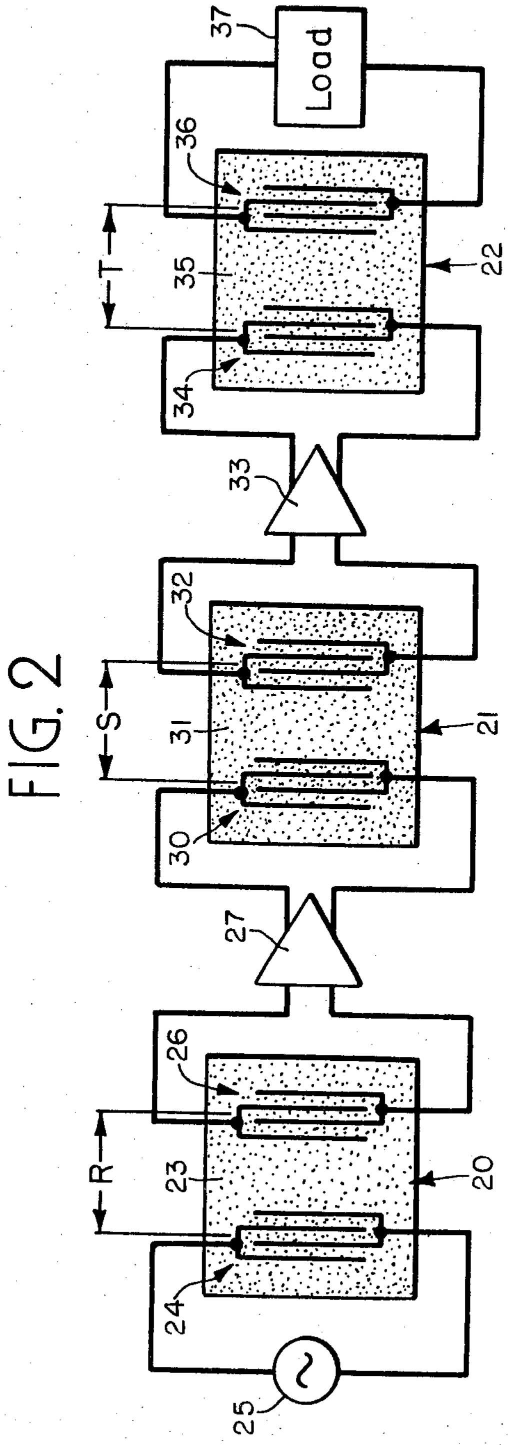
FIG. 2 is a schematic diagram of another embodiment of an acousto-electric signal-transmitting device.

In FIG. 2, the inter-transducer spacings are so chosen that affirmative cancellation is obtained of both undesired effects, that is, reflected waves and electrical feed-through. To this end, the filter system is comprised of three stages 20, 21 and 22. Stage 20 includes a piezoelectric medium 23 to which is coupled an input transducer 24 across which a source of desired signals 25 is connected. Stage 20 further includes an output transducer 26 which feeds electrical signals to the input terminals of an amplifier 27. Similarly, the second stage includes an input transducer 30 disposed on a piezoelectric substrate 31 and connected to receive the signal output from amplifier 27. An output transducer 32 feeds output signals from the second stage to the input terminals of another amplifier 33. The output signals from amplifier 33 are fed to the input transducer 34 of the third stage which includes a piezoelectric medium 35. Finally, the signals developed by an output transducer 36 of the third-stage are fed to a load 37.

The system of FIG. 2 functions in the same manner for desired signals from input signal source 25 as the corresponding stage of the system of FIG. 1. That is, input signal energy is caused to launch acoustic surface waves which propagate in the piezoelectric medium of that stage to its output transducer. The output signals developed by the output transducers of the first two stages are fed to a subsequent amplifier from which the amplified signals are coupled to the input transducer of the next succeeding stage. The final signal is delivered from the last output transducer 36 to load 37.

As before, the three stages 20, 21 and 22 are isolated from one another by means of amplifiers 27 and 33. Of course, the interstage amplifier may be omitted where unnecessary or otherwise not desired, provided that acoustic isolation is maintained between the different stages. As fully described in the aforesaid patent, all of the transducers in the system may be disposed on a common substrate wherein the different stages are acoustically separated by means of an acoustic-wave absorbing material disposed between each adjacent pair of stages or by forming the different stages to have different acoustic alignments.

Figure 3:
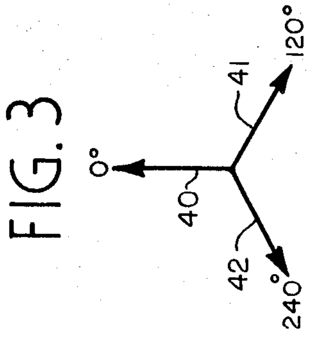
FIG. 3 is a vector plot used for an explanation of the operation of the device of FIG. 2.

To the end of suppressing spurious signals, the inter-transducer spacing in each of stages 20, 21 and 22 differs from the inter-transducer spacing in the next succeeding stage by one-third the acoustic wavelength. That is, with an inter-transducer spacing R between transducers 24 and 26 of stage 20, the inter-transducer spacing S of stage 21 is equal to $R+\lambda/3$ and the inter-transducer spacing T of third stage 22 is equal to $S+\lambda/3$. FIG. 3 represents the resultant vector summation of three electric-coupling related signal components that appear at output transducer 36 in third stage 22. Letting vector 40 represent the electric-coupling related component developed because of capacitive coupling between input transducer 24 and output transducer 26 in first stage 20, the additional one-third wavelength spacing between input transducer 30 and output transducer 32 of second stage 21 results in a 120° delay of the electric-coupling related signal component developed with two transducers, as represented by vector 41 in FIG. 3. In the same way, the still additional one-third wavelength spacing of input transducer 34 from output transducer 36 in third stage 22 results in the electric-coupling related signal component developed in that stage being delayed a further 120° as represented by vector 42 in FIG. 3. As thus "seen" by the final output transducer 36, the vector summation of the feed-through or electric-field related contributions of the three stages is, to a first order, zero.

Turning attention now to the presence of reflected signals, as already indicated in connection with FIG. 1, a portion of the acoustic-wave energy is reflected by output transducer 26 of the first-stage and returns to the input transducer 24 of the first-stage where it is again reflected back to output transducer 26. Thus, the resulting electrical signal impressed across input transducer 30 of the second stage corresponds to the superimposition of the desired original surface-wave signal transmitted through stage 20 and the undesired triple-transit surface-wave signal. That triple-transit signal, of course, is delayed an amount corresponding to the time it takes for the reflected signals to twice traverse the spacing between transducers 24 and 26. Similarly, in stage 21, an original surface-wave signal is transmitted between transducers 30 and 32, while a triple-transit signal also appears at its output transducer 32 as a result of the acoustic-wave reflected by that output transducer back to input transducer 30 where it is again reflected back to output transducer 32. Similarly, in third stage 22, a first surface wave traveling to the right of input transducer 34, corresponding to the original input signal, intercepts output transducer 36 and causes an electrical signal to be developed therein which is transmitted to load 37. A portion of that first surface wave, however, is reflected back toward input transducer 34 and arrives at that transducer at approximately the same time as the delayed triple-transit electrical signals developed in each of first and second stages 20 and 21.

Since, in FIG. 2, the inter-transducer distances of the successive stages differ effectively by one-third wavelength, the reflected waves, in traversing the different stages more than once, are delayed by different amounts. By tracing the paths of the different reflected waves in each of the three different stages, it may be shown that, in input transducer 34 of the third-stage, the three different reflected wave components develop electrical signals that are mutually phase displaced by 120°. As a result, the reflected wave energy is, at least to a first order, cancelled in that transducer. That is, FIG. 3 may be used in this case to represent the summation to zero of the reflected-wave components. Vector 40 may represent the reflected wave energy arising in stage 20, vector 42 may represent the undesired reflected wave component developed in stage 21 and vector 41 may represent the reflected wave component developed in stage 22.

With the incorporation, then, of a difference in spacings R, S and T to create the proper phase relationships with respect to the surface wave reflection components, all of the first-order reflected signal components arrive at the last filter stage input transducer in a manner such that the vector summation of the reflected signal components at least approximates zero. All higher-order reflected components, created when a reflected signal component propagates through a subsequent filter stage and creates further (higher-order) reflected signal components, are of sufficiently small magnitude as to be negligible. At the same time, the same difference in spacings R, S and T achieves simultaneous cancellation, although in output transducer 36, of the directly coupled feed-through signal components.

As thus far described, a particular fractional-wavelength difference in spacing has been described for each of the embodiments of FIGS. 1 and 2. More generally, each spacing is determined according to the total number of stages $N$ in the system and the location of a particular stage $n$ in the system. Each distance may be calculated from the relationship:

$$D_n = D_o + \frac{\lambda}{N}(n-1) + P_n\lambda, \quad (2)$$

where $D_n$ is the inter-transducer distance for any particular stage $n$, $D_o$ is any convenient distance, $N$ is the total number of stages in the system, $\lambda$ is the wavelength of the center-frequency acoustic wave and $P_n$ is any convenient integer or zero. As applied to the two-stage embodiment of FIG. 1 and letting $P_n$ equal zero, the inter-transducer spacings calculated from equation (2) are as follows:

$$D_1 = D_o \quad (3)$$

$$D_2 = D_o + \lambda/2 \quad (4)$$

The result is the half-wavelength difference in spacing between distances P and Q already described. On the other hand, and again letting $P_n$ equal zero, the inter-transducer spacings calculated from equation (2) for the three-stage embodiment of FIG. 2 are as follows:

$$D_1 = D_o \quad (5)$$

$$D_2 = D_o + \lambda/3 \quad (6)$$

$$D_3 = D_o + 2\lambda/3 \quad (7)$$

This last set of results will be seen to set forth the one-third wavelength spacing difference described with respect to FIG. 2. In a similar manner, it may be shown that a six-stage system (or any integral multiple of three stages) may be analogously arranged in order also to achieve both reflected-wave component and feed-through component cancellation at the same time.

In each of the foregoing embodiments, different actual physical inter-transducer spacings are utilized in successive stages in order to bring about the desired phase shift of predetermined amounts. It is not necessary, however, to use different actual spacings to achieve the benefits sought, because the acoustic wave velocity may be modified to achieve the same result and may, therefore, be considered to be a change in the effective inter-transducer spacing. This may be accomplished by using different materials for the substrates of the different filter stages or by using surface attenuating layers of appropriate composition and thickness as by spreading a thin coat of lacquer which introduces a velocity change by mass loading of the substrate. Slowing down the acoustic-wave propagation velocity is equivalent to increasing the physical spacing and, hence, results in a corresponding increase in effective spacing between the input and output transducers.

While optimum inhibition or cancellation of the undesired signal components requires that the inter-transducer spacing be proportioned to provide total cancellation of the undesired signal component, there are practical applications in which total cancellation is not required. For example, in applying the invention to the intermediate-frequency amplifier of a television receiver, reduction of the signal level of an undesired output signal component to a level 30 decibels below the level of the desired primary output signal components, as delivered to the ultimate load, is usually sufficient to eliminate ghosts from the reproduced image. In such applications, therefore, the inter-transducer spacings may be designed to provide less than complete signal cancellation for the sake of achieving reduced manufacturing costs and/or to present greater flexibility in overall filter design. Specifically, in the situation of the system of FIG. 1, less than optimum inter-transducer spacings, from the standpoint of feed-through cancellation, may be incorporated in order also to achieve some reduction of the contributions of reflected wave components by partial cancellation.

In the latter connection, it will be observed that the basic design criteria in FIG. 1 for the purpose of achieving feed-through cancellation is the antithesis of the design criteria taught by the aforementioned patent for the purpose of achieving cancellation of undesired reflected-wave components. Consequently, which of the two approaches is to be followed in a two-stage filter depends upon which mode of undesired spurious signals are found to be most troublesome in a given system. The present approach for the two-stage filter is advantageous in that, as already explained, inter-transducer spacings may be reduced for the purpose of reducing reflection problems while at the same time cancelling the feed-through that otherwise would have been increased by the very act of taking that approach. For the three-stage system, the present approach has been shown to be highly advantageous in that it permits simultaneous achievement of both reflection mode cancellation and feed-through mode cancellation.

While particular embodiments of the invention have been shown and described, it will be obvious to those skilled in the art that changes and modifications may be made without departing from the invention in its broader aspects and, therefore, the aim of the appended claims is to cover all such changes and modifications as fall within the true spirit and scope of the invention.

I claim:

1. A multi-stage solid-stage signal-transmission system comprising:

a plurality $N$ of mutually isolated acousto-electric filter stages each comprising an input transducer coupled to an acoustic-wave-propagating medium and responsive to an applied electrical signal of a predetermined center frequency for establishing acoustic waves of a predetermined acoustic wavelength in said medium, and each further comprising an output transducer coupled to said medium and spaced from its associated input transducer in the direction of acoustic-wave propagation therebetween, each output transducer being responsive to acoustic waves in said medium for developing an electrical signal corresponding thereto;

coupling means for impressing the electrical signal developed by the output transducer of each stage of said plurality of filter stages on the input transducer of the next successive stage of said plurality of filter stages;

and the input and output transducers of each particular one of said plurality of filter stages having an effective spacing in said direction of acoustic-wave propagation of a distance as determined by the equation:

$$D_n = D_o + \frac{\lambda}{N}(n-1) + P_n\lambda,$$

where $D_n$ is said distance for the particular stage $n$ of said plurality $N$ of filter stages, $D_o$ is any convenient distance, $\lambda$ is the wavelength of the center-frequency acoustic wave and $P_n$ is any integer or zero.

2. A system as defined in claim 1 in which the number $N$ of said filter stages is two and in which the input and output transducers of the second filter stage have an effective spacing in said direction of acoustic-wave propagation differing from the effective spacing between the input and output transducers of the first filter stage by an amount equal to one-half said acoustic wavelength to provide substantial attenuation of spurious signal components attributable to inherent coupling directly between the input and output transducers in each of said filter stages.

3. A system as defined in claim 1 in which the number $N$ of said filter stages is three, or an integral multiple thereof, and in which the individual different spacings between the input and output transducers of the respective different ones of said filter stages pursuant to said equation provide substantial attenuation of spurious signal components attributable both to acoustic wave reflections in said filter stages and to inherent coupling directly between the input and output stages in each of said filter stages.

* * * * *